(12) United States Patent
Hynes

(10) Patent No.: US 6,492,936 B1
(45) Date of Patent: Dec. 10, 2002

(54) FREQUENCY SPECTRUM ANALYZER

(75) Inventor: Robert Hynes, Oxon Hill, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 05/001,949

(22) Filed: Dec. 19, 1969

(51) Int. Cl.⁷ .............................................. G01S 7/285
(52) U.S. Cl. ..................... 342/90; 342/192; 342/196; 324/76.19
(58) Field of Search ........................... 343/5 R; 342/90, 342/13, 192, 193, 194, 195, 196; 324/76.19, 76.21, 76.22, 76.23, 76.24

(56) References Cited

U.S. PATENT DOCUMENTS

| | | | | |
|---|---|---|---|---|
| 3,156,869 A | * | 11/1964 | Whitwell et al. ............ | 324/109 |
| 3,321,759 A | * | 5/1967 | Freedman .................... | 324/192 |
| 3,364,426 A | * | 1/1968 | Hurvitz ..................... | 324/76.33 |
| 3,374,436 A | * | 3/1968 | Thiess ........................ | 455/148 |
| 3,569,845 A | * | 3/1971 | Steinberg ..................... | 329/340 |
| 3,573,612 A | * | 4/1971 | Scarr ......................... | 324/76.17 |
| 3,577,143 A | * | 5/1971 | Poirier et al. ................ | 342/118 |
| 3,581,192 A | * | 5/1971 | Miura et al. .............. | 324/76.31 |
| 3,581,199 A | * | 5/1971 | Spitz ........................ | 324/76.24 |
| 3,601,696 A | * | 8/1971 | Chovan et al. ........... | 324/76.25 |
| 3,603,990 A | * | 9/1971 | Poirier ........................ | 342/21 |
| 3,621,388 A | * | 11/1971 | Davis ........................... | 324/67 |
| 3,621,389 A | * | 11/1971 | Murray .................... | 324/76.24 |
| 3,631,484 A | * | 12/1971 | Augenblick .................. | 342/46 |
| 3,713,144 A | * | 1/1973 | Letten et al. ................ | 342/159 |
| 3,715,753 A | * | 2/1973 | Applebaum et al. ......... | 342/131 |
| 3,789,398 A | * | 1/1974 | Erst ............................. | 342/128 |
| 3,924,182 A | * | 12/1975 | Jensen ..................... | 324/76.12 |
| 4,169,993 A | * | 10/1979 | Taylor et al. ................ | 380/34 |
| 4,228,395 A | * | 10/1980 | Dusheck, Jr. et al. .... | 324/76.24 |

* cited by examiner

*Primary Examiner*—John B. Sotomayor
(74) *Attorney, Agent, or Firm*—John J. Karasek; Dorothy I. Becker

(57) ABSTRACT

Circuitry and technique for improving the analysis of a signal, such as radar return, by eliminating the effects of frequency variations of the carrier and thereby stabilizing the modulation spectrum. This is accomplished by tracking the carrier frequency and using it as a reference signal for translating the carrier frequency in the radar return to zero frequency.

8 Claims, 2 Drawing Sheets

US 6,492,936 B1

FREQUENCY SPECTRUM ANALYZER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Although radar has been known for only a relatively short time, it is inherently of immense value and has been intensively developed at great expense because of the ability to detect the presence, velocity, acceleration, range, height, azimuthal direction and direction of movement of a target, the nature and identity of which is often unknown. While interrogation and IFF equipment and procedures have been developed that provide identification of civil airliners and friendly military aircraft, this approach to identification of a radar target is inherently less than completely satisfactory because of the possibility of equipment malfunction and of the enemy developing the ability to deceptively negate IFF.

Because of the very obvious desirability of being able to determine the nature of the radar target from the radar return (i.e. the signal caused in the radar receiver by the target), great efforts have been, and are being, made to identify targets from the characteristics of the reflected signal. These reflected signal characteristics are often called the target signature.

One of the many difficulties in identifying targets by their radar signatures relates to the spectral smearing of the signature caused by frequency shifts of the carrier frequency $f_c$. These frequency shifts occur most often due to doppler frequency changes resulting from, intentional or otherwise, variations of the velocity of the target in a direction radially to the radar.

In an effort to avoid the disadvantages of spectral smearing caused by varying carrier frequency, two methods have often been used in prior radar signature analysis.

One method analyzes only a very short time sample of the signature, thereby minimizing the adverse effect of the frequency variation of the carrier $f_c$. This method, which provides for a study of the broad spectrum but only for a short time, has the disadvantage of limiting the spectral resolution and of discarding much signal information.

A second method filters out one component of the signature (with a tracking filter) and analyzes this one component in detail, i.e. such parameters as spectral width and amplitude statistics. This method provides for the study of a long time sample, but only over a narrow bandwidth, and has the disadvantage that the relation of the studied component to the rest of the signal is lost together with the related opportunities to obtain data by analysis of cross-spectral densities, covariances, multiple correlation functions, etc.

SUMMARY OF THE INVENTION

This invention seeks to avoid the disadvantages of prior methods of radar signature analysis by providing technique and circuitry wherein the carrier frequency of the input (signature) signal is tracked to obtain a reference signal. This reference signal is phase compared to the input signal, a process which in effect translates the carrier frequency to zero frequency and provides a stable (folded) spectrum which is independent of the frequency variations of the carrier and which can be analyzed over long time periods.

OBJECTS

It is, therefore, an object of the invention to provide improved apparatus and an improved technique for analyzing radar return signals to identify detected targets.

Another object is to provide the techniques of, and apparatus for, stabilizing the modulation spectrum of a radar target signature by eliminating the effects of frequency variations of the carrier frequency.

Yet another object is to provide improved apparatus and techniques for studying the spectrum of a carrier modulated signal, the improvement resulting largely from apparatus and techniques which eliminate the effects of frequency variations of the carrier.

A still further object of the invention is to provide the techniques of, and circuitry for, improving radar target signature analysis by tracking the carrier frequency $f_c$ to produce a reference signal which is phase compared with the target signature to furnish a signature spectrum which is independent of variations in the carrier frequency.

BRIEF DESCRIPTION OF THE DRAWINGS

Other objects, advantages and novel features of the invention will become apparent from the following detailed description of the invention when considered in conjunction with the accompanying drawings wherein.

DESCRIPTION OF THE PREFERRED EMBODIMENT

Figure 1A:
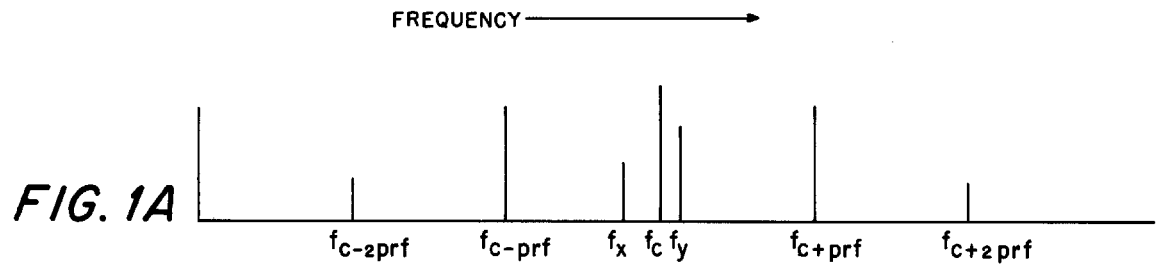
FIG. 1 includes a number of spectral diagrams which are useful in explaining the invention and FIG. 2 is a block diagram of a preferred embodiment of the invention.
Figure 1B:
Figure 1C:
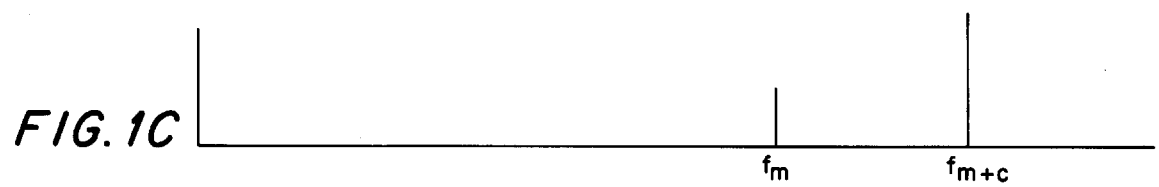
Figure 1D:
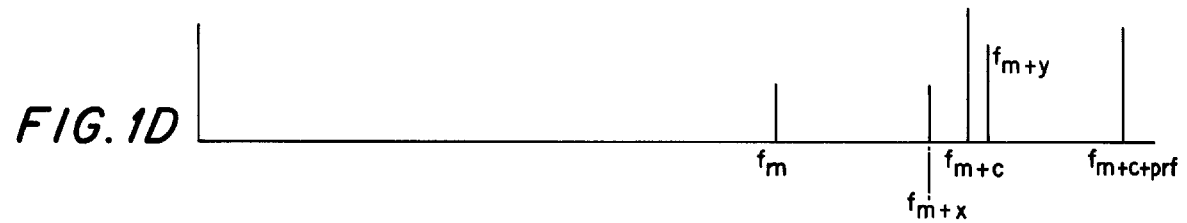
Figure 1E:
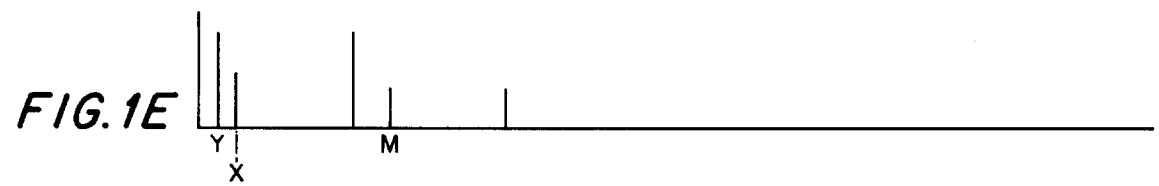
Figure 2:
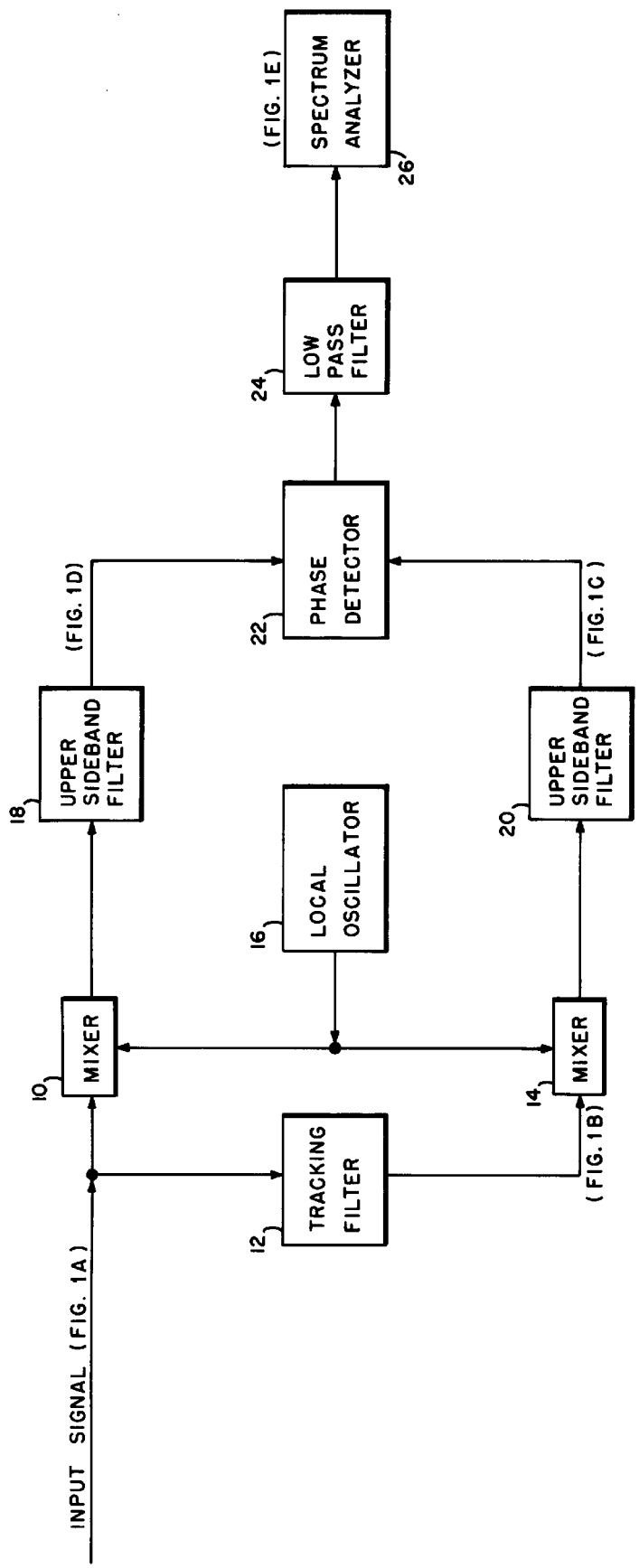

Referring now to the drawings wherein FIG. 1-A is representative of the amplitude spectrum of the signal input to the preferred embodiment of the invention illustrated in block diagram form in FIG. 2. This input signal is typically the video signal in the receiver of a pulse doppler radar from which appropriate filtering has removed the return from stationary targets. As the reader will, no doubt, realize, the spectrum of FIG. 1-A could also be representative of other input signals, such as the rf signal in cw radar.

In FIG. 1-A, which has been greatly simplified for ease of description and illustration, the carrier frequency $f_c$ is surrounded by a plurality of spectral lines which are representative of the various modulation sidebands, for example, the well known sin x/x envelope with lines spaced by the prf (which occurs in pulse radar) and by $f_x$ and $f_y$ lines that are representative of the radar signature of the target. The spectral lines $f_x$ and $f_y$, for example, may be caused by rotating or moving parts of the radar target, such as engine parts, antenna, lights, etc. As previously mentioned, $f_c$ and the entire spectrum of FIG. 1-A moves, or smears, for many reasons, including turning or weaving of the target, wind gusts and deliberate changes of velocity with deceptive intent.

Referring now to FIG. 2, the input signal is connected directly to mixer 10, and through tracking filter 12 to mixer 14. Both of the mixers 10, 14 are similarly connected to receive a second input signal from the local oscillator 16 and to apply their respective heterodyned outputs to upper sideband filters 18 and 20. The reader will, of course, realize that lower sideband filters can be used, if desired.

As shown in FIGS. 1-B and 1-C, the spectral output of tracking filter 12 is solely $f_c$ and the spectral output of the filter 20 consists of two components, the oscillator frequency $f_m$ and the sum of the carrier and oscillator frequencies $f_{m+c}$.

The spectral output of the filter 18 (shown in FIG. 1-D) is more complex and includes not only the oscillator frequency $f_m$ but also all of the upper sideband component lines which result from the mixing of the oscillator signal and the input signal.

Phase detector 22 is connected to receive the outputs of filters 18 and 20. The detector 22, in effect, uses the output of filter 20 as a reference and translates the carrier $f_c$ down to DC and folds the modulation spectrum about the zero frequency. The output of phase detector 22 is connected through the low pass filter 24 to a spectrum analyzer 26 which provides an indication of the spectrum of the input signal. This indication will be relatively fixed and independent of variations in the carrier frequency $f_c$ and, as shown in FIG. 1-E, contains components X and Y which are representative of the target signature and lines, such as M (related to the frequency of oscillator 16) that are representative of the constant operational parameters of the radar.

As the reader, no doubt, realizes, there are many known circuits which are suitable for use as the components shown in block form in FIG. 2. In view of this, and since the details of these components are not, per se, significant to the concept of the invention, it is not considered necessary to describe these details.

It should, by now, be realized that there has been disclosed improved apparatus and technique for analyzing radar return signals for the purpose of identifying detected targets. More specifically, there has been disclosed an invention wherein the radar return signal, schematically represented in the spectral illustration of FIG. 1-A, includes the carrier frequency $f_c$ and various other spectral components relating to the operational parameters of the radar and to the unique reflection characteristics of the target. The component $f_c$ and the other components shown in FIG. 1-A move, more or less together, in the frequency domain because of many reasons including a doppler frequency shift introduced by changes in the target velocity in a direction radial to the radar, propagation anomalies of the atmosphere and even inconstancies of the transmitter.

The carrier frequency $f_c$ of the input signal is tracked by filter 12 to provide a reference signal (FIG. 1-B) which is phase compared with the input signal by detector 22 after frequency translation by the heterodyning components 10, 14 and 16 and filtering by 18, 20. The phase detector 22 functions to translate the carrier frequency $f_c$ to DC by comparison of the signal (FIG. 1-D if heterodyned and filtered) with the reference (FIG. 1-C if heterodyned and filtered). Translating and fixing the carrier $f_c$ at DC effectively folds the spectrum about zero frequency and fixes (stabilizes) the components. The output of detector 22, after desirable but not necessary filtering 24, contains stabilized spectral component lines which may be studied together for relatively long time periods for the purpose of extracting data relating to the radar target signature, shown symbolically as X and Y in FIG. 1-E.

Obviously many modifications and variations of the present invention are possible in the light of the above teachings. In particular, while the invention has been disclosed in the radar environment primarily contemplated, it is apparent that the utility of the invention is not so limited and that the techniques and apparatus of the invention are applicable to the spectral analysis of any carrier modulated signal including many types of communication signals. It is therefore to be understood that within the scope of the appended claims the invention may be practiced otherwise than as specifically described.

What is claimed and desired to be secured by Letters Patent of the United States is:

1. The method of analyzing the modulation spectrum of a carrier signal comprising the steps of:

tracking the carrier component of said modulated carrier signal and producing a reference frequency signal therefrom;

comparing the phase of said reference frequency signal and of said modulated carrier signal and producing a phase difference signal representative of the phase difference therebetween and analyzing the spectrum of said phase difference signal.

2. The method of claim 1 and further including the step of translating by equal frequencies both the modulated carrier signal and the reference frequency signal before the step of phase comparing these signals.

3. The method of obtaining the signature of a radar target comprising the steps of:

producing a reference signal having a frequency instantaneously equal to the carrier component of the radar return;

phase comparing said radar return and said reference signal and producing a phase difference signal representative of the phase difference therebetween and analyzing the spectrum of said phase difference signal to separate frequency components attributable to the operating parameters of the radar and frequency components attributable to the reflection characteristics of the target.

4. The method of claim 3 and further including the step of translating by equal frequencies both the radar return and the reference signal before the step of phase comparing these signals.

5. A circuit for analyzing the modulation spectrum of a carrier signal comprising:

tracking filter means connected to receive said modulated carrier signal and functioning to pass only the carrier component thereof;

phase detection means connected to receive said modulated carrier signal and the carrier component output of said tracking filter means and functioning to produce a phase difference signal representative of the phase difference therebetween and a spectrum analyzer connected to receive said phase difference signal.

6. The circuit of claim 5 and further including heterodyning and filtering means connected to the input of said phase detection means and functioning to translate by equal frequencies both the modulated carrier signal and the carrier component output of said tracking filter means.

7. A circuit for use with a radar receiver for obtaining the reflection characteristics of a target from a carrier modulated receiver signal representative of the radar return, comprising:

tracking filter means connected to receive said carrier modulated receiver signal and functioning to pass only the carrier component thereof;

phase detection means connected to receive said carrier modulated receiver signal and the carrier component output of said tracking filter means and functioning to produce a phase difference signal representative of the phase difference therebetween and a spectrum analyzer connected to receive said phase difference signal whereby the spectrum analyzer will function independently of frequency variations of the carrier component of the carrier modulated receiver signal and will function to indicate frequency components attributable to the operating parameters of the radar and frequency components attributable to the reflection characteristics of the target.

8. The circuit of claim 7 and further including:

a first mixer connected to receive said carrier modulated receiver signal;

a second mixer connected to receive the carrier component output of said tracking filter means;

oscillator means connected to said first and said second mixers and producing a frequency stable signal;

sideband filter means connected between said first and said second mixer and said phase detection means and functioning to pass only those signal components having a higher frequency than the frequency of said stable oscillator signal and low pass filter means connected between said phase detection means and said spectrum analyzer and functioning to attenuate high frequency signal components in said phase difference signal.

* * * * *